United States Patent [19]

Rouse

[11] 4,390,188

[45] Jun. 28, 1983

[54] HIGH PRESSURE HYDRAULIC SYSTEMS

[75] Inventor: John A. Rouse, Warwickshire, England

[73] Assignee: Lucas Industries Limited, GBX2

[21] Appl. No.: 258,396

[22] Filed: Apr. 28, 1981

[30] Foreign Application Priority Data

May 3, 1980 [GB] United Kingdom ............... 8014937

[51] Int. Cl.³ ........................................... B62D 37/00
[52] U.S. Cl. ..................... 280/6.1; 280/6 H;
91/448; 91/530; 137/614.19; 137/614.2;
137/522; 251/141
[58] Field of Search ............... 251/141; 280/6 H, 6.1,
280/DIG. 1; 180/41; 91/444, 448, 530;
137/493.8, 522, 614.19, 614.2, 613

[56] References Cited

U.S. PATENT DOCUMENTS

| | | | |
|---|---|---|---|
| 2,294,421 | 9/1942 | Ray | 251/141 |
| 2,860,850 | 11/1958 | Rhodes et al. | 251/141 |
| 2,882,068 | 4/1959 | Faiver | 280/DIG. 1 |
| 2,891,577 | 6/1959 | Stewart, Jr. | 137/613 |
| 2,929,640 | 3/1960 | Faiver | 280/DIG. 1 |
| 3,183,932 | 5/1965 | Karpus, Jr. | 137/614.19 |
| 3,572,746 | 3/1971 | Mueller | 280/6 H |
| 3,606,365 | 9/1971 | Strong | 280/6 H |

Primary Examiner—A. Michael Chambers
Attorney, Agent, or Firm—Scrivener, Clarke, Scrivener and Johnson

[57] ABSTRACT

In a high pressure hydraulic system wherein a source supplies pressurized fluid to a slave unit through a control valve operative to maintain the slave unit in a desired condition, leakage from the slave unit past the control valve when the source is inoperative is prevented by a control valve comprising two solenoid-operated valves, oppositely acting and arranged in series between the source and the slave unit, each valve being closed to prevent flow through the valve in a direction towards the other valve and opened to permit flow in both directions, under the control of a solenoid and the pressure differential acting across the valve. A seating portion on the valve located between the other valve and the slave unit is of elastomeric material to provide a leakproof seal when that valve is closed.

In the construction shown the slave unit is an hydraulic suspension strut, and the system is adapted as a vehicular suspension levelling system, with the valves and the source being manipulated as required by an electronic control system.

15 Claims, 3 Drawing Figures

HIGH PRESSURE HYDRAULIC SYSTEMS

This invention relates to high pressure hydraulic systems of the kind in which a slave unit, for example an hydraulic suspension strut of a vehicle hydraulic suspension system, is supplied with fluid under pressure from a source through a control valve assembly which is operative to maintain the slave unit in a desired condition.

In an hydraulic system of the kind set forth, the problem of controlling leakage past the control valve assembly when the source is inoperative may arise. This problem can be solved by the use of elastomeric seals, but if a valve with such a seal opens against a pressure differential the seal is liable to extrusion. The seal must resist extrusion if it is to have a reasonable life, but as the pressure in the system is raised the seal needs to be made of stiffer material to resist extrusion, and eventually a pressure is reached where the stiffness required reduces the sealing efficiency to an unacceptable level. Pressures above this will be defined as "high pressures".

A further problem that occurs in hydraulic systems of the kind set forth is that of minimising the force required to operate valves in the control valve assembly, so that, for example, if the valves are solenoid-operated, the current taken by the solenoids will not be excessive.

In the Specification of our published U.K. Patent /Application No. GB 2 045 177 A, we have disclosed a high pressure hydraulic system of the kind set forth in which the control valve assembly comprises two solenoid-operated valves, oppositely acting and arranged in series between the source and the slave unit, each valve being closed to prevent flow through the valve in a direction from the other valve and opened to permit flow in both directions under the control of the solenoid and the pressure differential acting across the valve, and a seating portion on a first valve is of elastomeric material to provide a leakproof seal when that valve is closed.

In this known construction therefore leakage from the slave unit past the control valve is prevented by the leakproof seal on the first valve, but that seal is able to resist extrusion as the solenoids are not sufficiently powerful to open the valves against a significant pressure differential. However, this construction has the disadvantage that it creates a trapped volume of high pressure fluid between the two valves. To avoid this a small, controlled leak must be provided past the second valve, and the size of the leak may be difficult to control within normal manufacturing tolerances.

According to our invention in a high pressure hydraulic system of the kind set forth the control valve assembly comprises first and second solenoid-operated valves, which are oppositely acting and arranged in series with the first valve located between the source and the second valve, and the second valve located between the first valve and the slave unit, each valve being movable into a closed position in which fluid flow through the valve in a direction towards the other valve is substantially prevented, and an open position in which flow in both directions is permitted, movement of each valve between the open and closed positions being controlled by a solenoid and a pressure differential acting across the valve and each valve comprises a seating member, and a valve member for engagement with the seating member, the seating portion of one of the members of the second valve comprising an element of elastomeric material to provide a substantially leakproof seal when that valve is in the closed position.

Since the second valve is substantially leakproof, it is operative to prevent fluid leaking back from the slave unit to the source when the first valve is open and the source is inoperative. Further, since the valves allow fluid to leak out of the volume between them, rather than into it, the need for a controlled leak past the non-leakproof valve is obviated. Thus, if one of the valves is held shut by the pressure differential acting across it, a pressure differential across the other valve cannot build up, and that other valve tends to the open position.

Preferably, the solenoids are energised in order to move the valves from the closed into the open position, but the solenoids are not sufficiently powerful to open the valves against any significant pressure differential. This ensures that the elastomeric seal in the second valve is not destroyed by extrusion. Once the valves are open, they remain open while the solenoids are energised irrespective of the direction of fluid flow.

When the solenoids are de-energised, the pressure differential will determine the position of the valves, and each valve acts as a one-way valve, permitting fluid flow in a direction from the other valve.

In operation therefore fluid flow between the source and the slave unit is controlled by operation of the solenoids and the pressure differential between the source and the slave unit. Energisation and de-energisation of the solenoids is preferably controlled by an electronic control system which may also control operation of the source.

Preferably, the source is normally maintained at a low pressure, but when operative it is cycled slowly and continuously over a range of pressures which includes, and exceeds, the range of pressures which occur in the slave unit. Normally the solenoids are de-energised so that the second valve is held closed by the slave pressure, and the first valve will be in the open position.

Then, if the pressure in the slave unit is to be increased, the solenoid of the first valve is energised, and the source pressure is cycled, so that the first valve is held open while the source pressure rises. When the source pressure exceeds the slave pressure the second valve will act as a one-way valve to permit fluid to flow into the slave unit until either the source pressure falls below the slave pressure to close the second valve, or the solenoid of the first valve is de-energised to close the first valve, with the second valve closing and the first valve opening when the source pressure falls below the slave pressure.

If the pressure in the slave unit is to be decreased, the solenoid of the second valve is energised and the source pressure cycled, but the second valve will not open until the pressure differential acting across it is sufficiently reduced. When the second valve opens it is held open by the solenoid, and the resulting flow of fluid into the slave unit closes the first valve. When the source pressure falls below the slave pressure the first valve will act as a one-way valve to allow fluid to flow out of the slave unit until the solenoid of the second valve is de-energised to close that valve.

In a modification the source is normally maintained at a high pressure, and when operative is cycled over the same range of pressures as before. Normally the solenoids are de-energised, so that this time the first valve is held closed by the source pressure, and the second valve is open. The operation of the system in increasing and decreasing slave pressure will be analogous to that described above, and it will be operative as before to prevent leakage from the slave unit past the second valve if the source is inoperative and loses pressure. In this modification the first valve also may be made leakproof to ensure that fluid cannot leak from the source into the slave unit.

In one embodiment the slave unit comprises an hydraulic suspension strut. In this case pressure in the strut can be considered as a static pressure, due to the weight of the vehicle, and a dynamic pressure, due to ride movement, superimposed to produce a "ripple" at ride frequency. The static pressure will vary due to changes in the loading on the vehicle. Changes in these pressures will cause changes in ride height signals, in response to which the electronic control system manipulates the operation of the source and the control valve assembly to operate a suspension levelling system.

Such a system will operate as described above, although it should be ensured that the "ripple" in the strut pressure does not affect the operation of the control valve assembly by choosing the appropriate rate of pressure rise and fall of the source pressure cycle.

In such a suspension system, the pressure source conveniently comprises a manifold for supplying at least two struts simultaneously, for example the suspension struts of a pair of wheels on opposite sides of a vehicle.

One embodiment of our invention and a modification are illustrated in the accompanying drawings in which.

Figure 1:
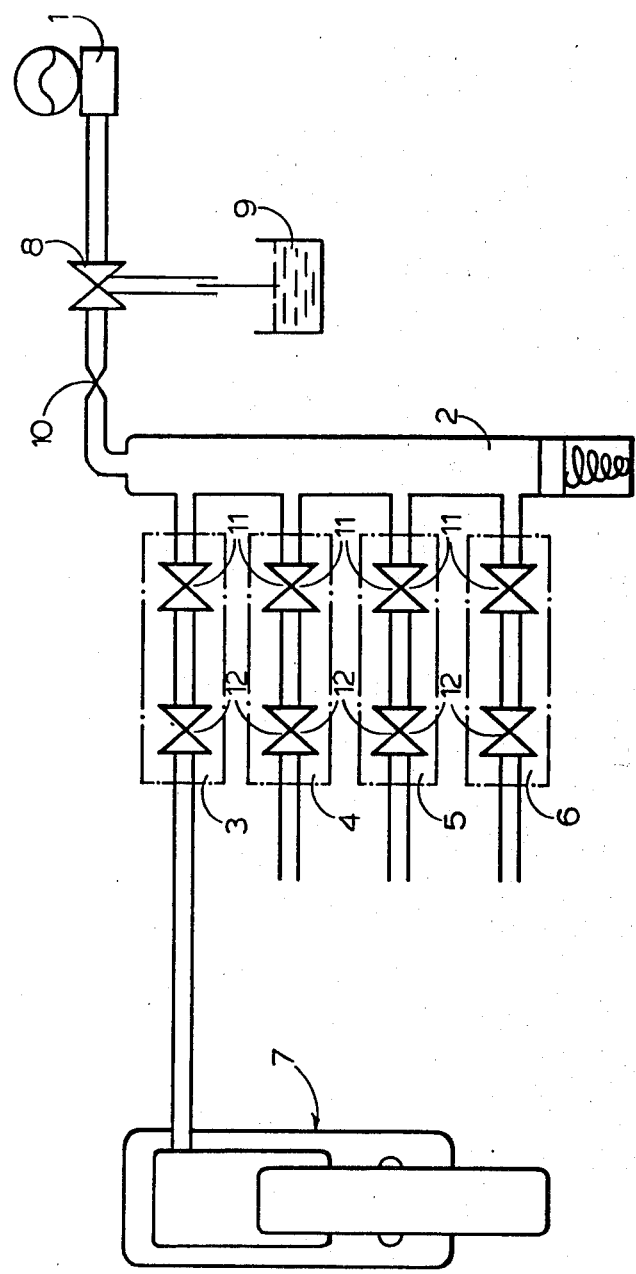
FIG. 1 is a layout of a suspension levelling system for a vehicle.

In the suspension levelling system illustrated in FIG. 1, hydraulic fluid from an hydraulic pressure source 1, suitably an accumulator, is supplied from a common manifold 2 to two pairs of hydraulic suspension struts through control valve assemblies 3, 4, 5 and 6. Only one strut 7 is illustrated, and the struts of each pair are arranged to support the wheels of a pair of wheels on opposite sides of the vehicle.

A three-way valve 8 is interposed between the source 1 and the manifold 2, the valve 8 being adapted to connect the manifold 2 either to the source 1 or to a tank 9 at atmospheric pressure. An orifice 10 is interposed in the line between the valve 8 and the manifold 2.

Each control valve assembly 3, 4, 5 and 6 comprises a pair of solenoid-operated first and second valves 11 and 12 respectively. These are oppositely acting and arranged in series. Each valve 11, 12 is movable between a closed position in which fluid flow through the valve in a direction towards the other valve is prevented, but the valve acts as a one-way valve to permit fluid flow in a direction from the other valve, and an open position in which fluid flow in both directions is permitted. When the solenoid of a valve 11, 12 is de-energised, the pressure differential will determine the position of the valve, and when the solenoid is energised the valve will tend to open, but may not do so against a significant pressure differential. When the valve 11, 12 is open and the solenoid is energised, the valve remains open irrespective of the direction of fluid flow.

Figure 2:
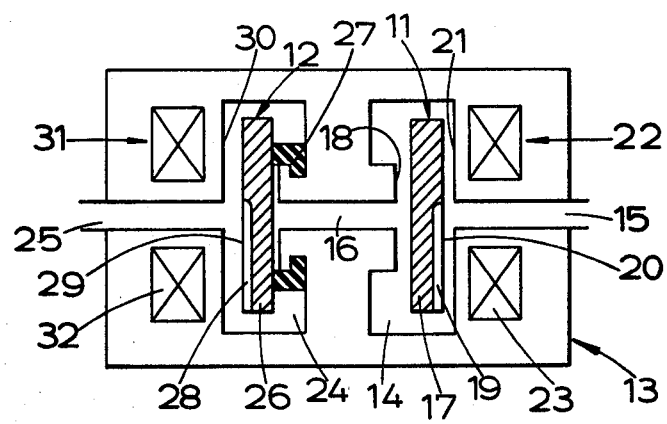
FIG. 2 is a diagrammatic representation of a control valve assembly for the system of FIG. 1.

One of the control valve assemblies 3, 4, 5 or 6 is illustrated diagrammatically in FIG. 2. The valves 11, 12 are located in a common housing 13. The first valve 11 is located in a first valve cavity 14, which has on one side a connection 15 to the manifold 2, and on the opposite side a connection 16 to the second valve 12. A valve member in the form of a metal plate 17 is located in the cavity 14, and is movable into the closed position in which it seats on a seating portion 18 surrounding the connection 16 to prevent fluid flow towards the second valve 12. When the plate 17 is not in contact with the seating portion 18, the first valve 11 is in the open position, in which fluid can flow through the valve in both directions. A radial slot 19 is provided on the side 20 of the valve plate 17 remote from the seating portion 18, so that fluid flow is permitted even when the plate 17 engages with the housing portion 21 surrounding the connection 15. A solenoid 22 is located on the side of the valve 11 nearer the manifold 2, a solenoid coil 23 being energised in order to attract the valve plate 17 away from the closed position.

Similarly, the second valve 12 is located in a second valve cavity 24 in the housing, which has a connection 25 to the strut 7 opposite the connection 16 to the first valve 11. A valve plate 26 is located in the cavity 24, and is movable into the closed position in which it seats on an elastomeric seating member 27 surrounding the connection 16 to provide a leakproof seal preventing flow of fluid towards the first valve 11. The member 27 is preferably of rubber. When the plate 26 is disengaged from the seating member 27 the valve 12 is in its open position. A radial slot 28 is provided on the side 29 of the plate 26 remote from the seating member 27 so that fluid flow is permitted when the plate 26 contacts the housing portion 30 surrounding the connection 25. A solenoid 31 is located on the side of the valve 12 nearer the strut 7, a solenoid coil 32 being energised in order to attract the valve plate 26 away from the closed position.

The detailed construction of the control valve assembly may be similar to that illustrated and described in U.K. Patent Application No. GB 2 045 177 A, in which the valves 11 and 12 are located in positions perpendicular to that shown in FIG. 2, so that the connections 15 and 25 are parallel, and separate first and second valve cavities are provided in the housing, in which the valve members 17, 26 are located by a rubber seal. The solenoids 22, 31 are combined into one solenoid block, with one composite plate forming the pole pieces for both solenoids.

In operation, the three-way valve 8 is used to cycle the pressure in the manifold 2, which is normally low, over a range which includes, and exceeds, the range of static pressures which occur in any of the struts 7.

The frequency of the cycle is determined by the size of the orifice 10, and an electronic control system controls the operation of the cycle and the energisation and de-energisation of the solenoids in response to ride height signals.

In an inoperative position, shown in FIG. 2, with the manifold pressure low, the solenoids of both valves are de-energised, so that the pressure in the strut 7 will hold the valve 12 in the closed position, and the valve 11 which has no pressure differential acting across it since a pressure higher than the manifold pressure cannot be trapped between the valves 11 and 12, will be in the open position. If the manifold pressure is cycled and the solenoids remain de-energised, the second valve 12 will open and the first valve 11 will close when the manifold pressure reaches the strut pressure, and when the manifold pressure falls below the strut pressure again the first valve 11 will open and the second valve 12 will close.

If the pressure in the strut 7 is to be increased, the manifold pressure is cycled, and the solenoid 22 of the first valve 11 is energised, which holds the first valve open while the manifold pressure rises. When the manifold pressure exceeds the strut pressure, the second valve 12 will act as a one-way valve to permit fluid to flow into the strut. When the desired strut pressure is reached, the solenoid 22 is de-energised and the first valve 11 closes, and remains closed while the manifold pressure continues its cycle. When the manifold pressure falls below the strut pressure the first valve 11 opens again, and the second valve 12 then closes.

In a modification, when the desired strut pressure is reached, the electronic control system allows the manifold pressure to fall immediately the solenoid 22 is de-energised.

If the pressure in the strut 7 is to be decreased, the manifold pressure is cycled, and the solenoid 31 of the second valve 12 is energised, but the valve 12 will open only when the pressure differential across it is reduced to an insignificant value. The resulting fluid flow into the strut moves the first valve 11 into the closed position, while the second valve remains open due to the solenoid. When the manifold pressure falls below the strut pressure the first valve 11 acts as a one-way valve to allow fluid to flow out of the strut 7. When the requisite strut pressure is reached, the solenoid 31 is de-energised, so that the second valve 12 moves into its closed position.

Figure 3:
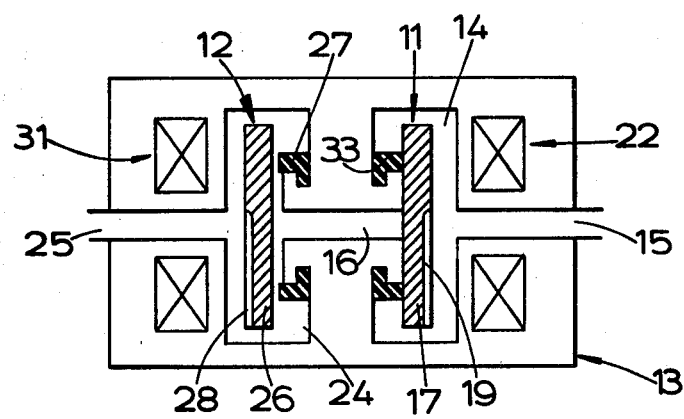
FIG. 3 is similar to FIG. 2, and shows a modification of the control valve assembly.

The control valve assembly shown in FIG. 3 is modified for operation in the suspension levelling system if the manifold 2 is normally maintained at a high pressure, and is cycled over the same range of pressures as in the previous embodiment. In the assembly of FIG. 3, which is a modification of the assembly of FIG. 2, corresponding reference numerals have been applied to corresponding parts.

In FIG. 3, an elastomeric seating member 33 similar to member 27 is provided round the connection 16 of the first valve 11. This ensures that high pressure fluid cannot leak into the strut 7 when the first valve 11 is in the closed position. Also, the second valve 12 may be provided with a light spring (not shown) to ensure that it moves into the closed position when the solenoid 31 is de-energised. Alternatively, the valve plate 26 may be so placed that its weight has the same effect.

In the inoperative position shown in FIG. 3, the first valve 11 is closed due to the high manifold pressure, while the second valve 12 is in the open position. If, when the source is inoperative, the manifold pressure falls below the strut pressure, the second valve 12 will close to ensure that the pressure is retained in the strut. Clearly, operation of this embodiment is analogous to that of the previous embodiment, taking into account the fact that the manifold pressure cycle is reversed.

It will be appreciated that for both these embodiments the means for cycling the manifold pressure may be modified. In one modification (not shown) the pressure source comprises a pump, and the manifold pressure is increased directly by the pump being driven in response to the signals controlling the valve 8. In this case, the manifold pressure may be decreased by reversal of the pump, in spite of any fluid flow out of the strut. In this modification the orifice 10 can be omitted.

In a second modification (not shown) the pressure source comprises a continuously driven pump, and the valve 8 and orifice 10 are omitted. Flow from the pump is by-passed to the reservoir 9 through a solenoid valve. Signals from the electronic control system operate the solenoid valve to close and open the by-pass, causing the manifold pressure to increase and decrease respectively.

I claim:

1. A high pressure hydraulic system comprising a slave unit, a source of hydraulic fluid for supplying said slave unit with fluid under pressure, and a control valve assembly for controlling the supply of hydraulic fluid to said slave unit, said control valve assembly comprising first and second solenoid-operated valves, and first and second solenoids for respectively operating said first and second valves, a pressure differential acting across each of said valves also to operate said valves, said valves being oppositely acting and arranged in series with said first valve located between said source and said second valve, and said second valve located between said first valve and said slave unit, each one of said valves being movable into a closed position in which fluid flow through said one valve in a direction towards the other of said valves is substantially prevented, and an open position in which fluid flow through said one valve in both directions is permitted, said solenoids and said pressure differentials across said valves controlling movement of said valves between said open and said closed position, and each one of said valves comprising a seating member having a seating portion and a valve member having a complementary seating portion for engagement with said seating portion of said seating member, said seating portion of one of said members of said second valve comprising an element of elastomeric material to provide a substantially leakproof seal when said second valve is in said closed position.

2. A high pressure hydraulic system as claimed in claim 1, wherein said seating member of said second valve comprises an element of elastomeric material.

3. A high pressure hydraulic system as claimed in claim 1, wherein each one of said valves acts as a one-way valve when in said closed position, permitting fluid flow in a direction from the other of said valves.

4. A high pressure hydraulic system as claimed in claim 3, wherein each one of said solenoids is energised in order to move the respective one of said valves into said open position only when said pressure differential acting across said valve against the action of said solenoid is insignificant.

5. A high pressure hydraulic system as claimed in claim 4, wherein continuous energisation of each one of said solenoids causes the respective one of said valves, when in said open position, to remain in said open position irrespective of the direction of fluid flow, said pressure differential acting across said valve to determine the position of said valve when said solenoid is de-energised.

6. A high pressure hydraulic system as claimed in claim 5, wherein said source is normally maintained at a low pressure, and when operative is cycled slowly and continuously over a range of pressures which includes, and exceeds the range of pressures which occur in said slave unit.

7. A high pressure hydraulic system as claimed in claim 6, wherein said solenoids are normally de-energised so that said second valve is held in said closed position by said pressure differential across said second valve and said first valve is in said open position, said source being operative to cycle said source pressure, said solenoid for said first valve being energised to hold said first valve in said open position whilst said source pressure rises, said second valve acting as a one-way valve when said source pressure exceeds the pressure in said slave unit to cause fluid to flow into said slave unit until either said source pressure falls below said slave pressure to close said second valve or said solenoid for said first valve is de-energised to close said first valve, said second valve closing and said first valve opening when said source pressure falls below said slave pressure.

8. A high pressure hydraulic system as claimed in claim 6, wherein said solenoids are normally de-energised so that said second valve is held in said closed position by said pressure differential across said second valve and said first valve is in said open position, said source being operative to cycle said source pressure, and said solenoid for said second valve being energised so as to cause said second valve to move into said open position when said pressure differential acting across said second valve is sufficiently reduced, said second valve being held in said open position whilst said solenoid is energised and said source pressure rises above said slave pressure so that fluid flows into said slave unit causing said first valve to close, and said first valve acting as a one-way valve to allow fluid to flow out of said slave unit when said source pressure falls below said slave pressure until said solenoid for said second valve is de-energised to close said second valve.

9. A high pressure hydraulic system as claimed in claim 5, wherein said source is normally maintained at a high pressure, and when operative is cycled slowly and continuously over a range of pressures which includes, and extends beyond, the range of pressures which occur in said slave unit, and said solenoids are normally de-energised so that said first valve is held in said closed position by said pressure differential across said first valve and said second valve is in said open position.

10. A high pressure hydraulic system as claimed in claim 1, wherein said seating portions of one of said members of said first valve also comprises an element of elastomeric material to provide a substantially leakproof seal when said first valve is in said closed position.

11. A high pressure hydraulic system as claimed in claim 1, further comprising an electronic control system for controlling energisation and de-energisation of said solenoids.

12. A high pressure hydraulic system as claimed in claim 11, wherein said electronic control system also controls operation of said source.

13. A high pressure hydraulic system as claimed in claim 1, wherein said slave unit comprises an hydraulic suspension strut for a wheel of a vehicle.

14. A high pressure hydraulic system as claimed in claim 13, wherein said suspension strut produces ride height signals according to the loading of said vehicle and incorporating an electronic control system for manipulating said control valve assembly and said source in response to said ride height signals to constitute a suspension levelling system.

15. A high pressure hydraulic system as claimed in claim 14, wherein said source comprises a manifold for supplying at least two hydraulic suspension struts simultaneously.

* * * * *